No. 677,071.  Patented June 25, 1901.
A. H. EDDY.
COLLECTOR FOR ELECTRIC GENERATORS AND MOTORS.
(Application filed Mar. 27, 1901.)
(No Model.)
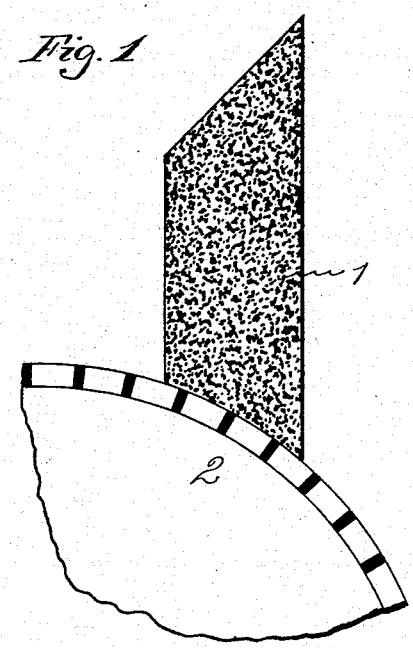
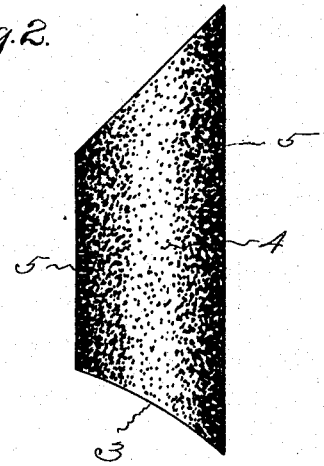
Witnesses
C. F. Kilgore
V. R. Holcomb
Inventor
Arthur H. Eddy,
by Harry R. Williams
Attorney

UNITED STATES PATENT OFFICE.

ARTHUR H. EDDY, OF WINDSOR, CONNECTICUT.

COLLECTOR FOR ELECTRIC GENERATORS AND MOTORS.

SPECIFICATION forming part of Letters Patent No. 677,071, dated June 25, 1901.

Application filed March 27, 1901. Serial No. 53,058. (No model.)

*To all whom it may concern:*

Be it known that I, ARTHUR H. EDDY, a citizen of the United States, residing at Windsor, in the county of Hartford and State of Connecticut, have invented certain new and useful Improvements in Collectors for Electric Generators and Motors, of which the following is a specification.

This invention relates to the formation of those collectors for electric generators and motors which are manufactured from powdered substances into blocks and are held against the commutators by applied spring-pressure.

The object of this invention is to produce a collector of this nature which has a texture, density, and qualities of such character that in use it will have a long life, will lubricate and burnish the commutator, and will collect the currents from the segments without sparking regardless of the amount of the load, the speed of the armature, and the force of the spring which compresses it against the commutator.

The invention resides in a collector for motors and generators composed of a compacted mass of metallic oxid and particles of pure metal having the required firmness, proper density, and desired conductivity and the art of forming such a collector, as more particularly hereinafter described, and pointed out in the claims.

Figure 1 of the accompanying drawings shows a side view of a collector formed according to the invention, and Fig. 2 is a view illustrating the difference in conductivity of various portions of a collector that embodies the invention.

This collector 1 may be made by placing a quantity of oxid of metal, such as black oxid of copper, into a mold and by moderate pressure compacting it to a shape that will fit the holder and the commutator 2. Instead of a single oxid combinations of oxids could be used for this purpose, and, if desired, powdered substances that are not oxids could be mixed with the oxids. This mass of oxid thus compressed may then be placed in a crucible and heated and at the same time subjected to the action of an agent which will more or less reduce the oxid to a metallic state. This may be accomplished by subjecting the compressed mass at a red heat to any of the well-known reducing agents, such as hydrogen or vapors of carbon. This action is carried on until the oxid, which is a non-conductor of electricity, is reduced to a metallic state sufficiently to have the necessary degree of conductivity. It is preferred that the reduction be stopped before all of the oxid is reduced, so as to leave enough not deoxidized to act as a lubricant upon the commutator. If desired, a lubricating material, such as talc, that does not reduce may be mixed with the oxid before the mass is molded.

The temperature employed during the reduction of the oxid and the period of such treatment may be varied according to the substances used and to the density, hardness, and conductivity that it is required the finished collector shall have. In this manner a collector can be made having just the desired degree of conductivity to act well, and sufficient resistance to prevent short-circuiting through the brush and to prevent sparking. The treatment produces a block having such lubricating qualities and density that it will act upon the commutator with but little friction and have a long life. It is also possible to produce a collector 3 the cross-section of which varies in conductivity. By varying the time of treating the faces of the molded mass of oxid or by a proper distribution of the oxids in the mold the blocks may be made to have greater conductivity through the center 4 than near the faces 5. Such a collector offers but very little resistance to the flow at the full flow of current and yet offers an increased resistance to prevent short-circuiting through the brush and sparking due to slight changes of the point of commutation under varying loads.

I claim as my invention—

1. A collector for electric generators and motors consisting of a cemented mixture of particles of oxid of metal and particles of pure metal, substantially as specified.

2. A collector for electric generators and motors consisting of a compressed mass of particles of partially-reduced oxid of metal, substantially as specified.

3. The art of forming collectors for electric generators and motors, which consists in molding oxid of metal, and subjecting the molded oxid under high temperature to the action of a substance that envelops the molded oxid and has, at the heat used, such affinity for the oxygen of the oxid that the non-conducting oxid is reduced to a metallic condition having the desired electrical conductivity, substantially as specified.

ARTHUR H. EDDY.

Witnesses:
HARRY E. HEATH,
LEON W. BAILEY.